United States Patent [19]

Nozawa et al.

[11] Patent Number: 6,160,052
[45] Date of Patent: Dec. 12, 2000

[54] RUBBER-MODIFIED AROMATIC VINYL RESIN COMPOSITION AND PROCESS FOR THE PRODUCTION THEREOF

[75] Inventors: Masayuki Nozawa, Yokohama; Masanari Fujita; Yasuji Shichijo, both of Kisarazu, all of Japan

[73] Assignee: Nippon Steel Chemical Co., Ltd., Tokyo, Japan

[21] Appl. No.: 09/051,865

[22] PCT Filed: Oct. 30, 1996

[86] PCT No.: PCT/JP96/03174

§ 371 Date: Apr. 21, 1998

§ 102(e) Date: Apr. 21, 1998

[87] PCT Pub. No.: WO97/16489

PCT Pub. Date: May 9, 1997

[30] Foreign Application Priority Data

| Oct. 31, 1995 | [JP] | Japan | 7-283526 |
| Oct. 31, 1995 | [JP] | Japan | 7-306483 |
| Oct. 31, 1995 | [JP] | Japan | 7-306484 |

[51] Int. Cl.$^7$ ..................................................... C08F 8/00
[52] U.S. Cl. ........................... 525/102; 524/267; 524/269; 524/462
[58] Field of Search ............................. 525/102; 524/267, 524/269, 462

[56] References Cited

U.S. PATENT DOCUMENTS

| 5,039,714 | 8/1991 | Kasahara et al. | 521/148 |
| 5,294,656 | 3/1994 | Okamoto et al. | |

FOREIGN PATENT DOCUMENTS

| 59-221318 | 12/1984 | Japan . |
| 1-34453 | 7/1989 | Japan . |
| 3-62723 | 9/1991 | Japan . |
| 3-76338 | 12/1991 | Japan . |
| 5-11143 | 2/1993 | Japan . |
| 5-18348 | 3/1993 | Japan . |
| 5-25897 | 4/1993 | Japan . |
| 5-45624 | 7/1993 | Japan . |
| 5-279427 | 10/1993 | Japan . |
| 5-279428 | 10/1993 | Japan . |
| 7-53816 | 6/1995 | Japan . |

*Primary Examiner*—Bernard Lipman
*Attorney, Agent, or Firm*—Darby & Darby

[57] ABSTRACT

Provided is a rubber-modified aromatic vinyl resin composition, wherein (a) 4 to 20% by weight of a rubber-like polymer is contained, (b) the rubber-like polymer is dispersed in the aromatic vinyl polymer in the form of grains, and the dispersed grains have a weight-average grain diameter falling in a range of 0.4 to 0.8 μm, (c) the dispersed grains have 1.0 μm or less of a 5% value and 0.2 μm or more of a 95% value in a cumulative grain diameter distribution on a weight basis, (d) a ratio of toluene-insoluble matters to a rubber component each of which is contained in the said composition falls in a range of 1.0 to 2.5, and (e) 0.005 to 0.5% by weight of a silicone oil or the mixed oil of the same amount of silicone oil and a fluorine compound oil of 0.0002 to 0.03% by weight is contained in the said composition. The rubber-modified aromatic vinyl resin composition described above is excellent in a balance between an impact resistance and a rigidity, and has an excellent gloss.

11 Claims, No Drawings

RUBBER-MODIFIED AROMATIC VINYL RESIN COMPOSITION AND PROCESS FOR THE PRODUCTION THEREOF

TECHNICAL FIELD

The present invention relates to a rubber-modified aromatic vinyl resin composition which is excellent in a balance between impact strength and rigidity and has an excellent gloss, and a process for producing the same.

BACKGROUND ART

Conventional rubber-modified styrene resin compositions have a low impact resistance as compared with an ABS resin, and therefore in order to elevate the impact resistance, rubber-like polymer grains having a grain diameter (rubber grain diameter) usually controlled to 1 to 3 μm are dispersed in a styrene resin phase. However, there has been a problem that the inferior appearance thereof makes it difficult to use them for uses requiring an excellent appearance. Accordingly, proposed are a method in which for the purpose of improving a balance between the impact resistance and the gloss, a rubber-modified styrene resin composition having a rubber grain diameter of 1 μm or less is blended a with silicone oil to make up the impact resistance (Japanese Patent Publication No. Hei 3-76338, Japanese Patent Publication No. Hei 5-11143 and Japanese Patent Publication No. Hei 5-45624) and a method in which in addition to the above, a proportion of a gel component to a rubber component is controlled (Japanese Patent Publication No. Hei 7-53816). However, a balance between the impact resistance and the rigidity has not yet been good in these methods. Further, it is proposed in Japanese Patent Publication No. Hei 3-62723 and Japanese Patent Publication No. Hei 1-34453 to improve the coloring property and the appearance by controlling the average grain diameter of an aromatic vinyl polymer included in a rubber-like material. In addition to this, proposed, for example, in Japanese Patent Publication No. Hei 5-25897 and Japanese Patent Publication No. Hei 5-18348 is a method in which rubber grains having a single occlusion (core shell, capsule) structure are blended with rubber grains having a salami structure to form a two-peak rubber grain diameter distribution, whereby a balance between the impact resistance and the gloss is improved to bring the characteristics close to those of an ABS resin. Any of these methods, however, causes such a problem that while high values are shown in measuring the gloss, the gloss intensity (visibility of the reflected image) observed when the actual molded articles are evaluated by eyes is insufficient and the reflected image on the surface of the molded article has a haze, and further that the molded articles have a low surface hardness and are lacking in an abrasion resistance, whereby they are limited in uses.

Thus, the balance of the gloss with the impact resistance and the rigidity is insufficient, and the satisfying quality has not yet been obtained. Accordingly, materials having an excellent balance therebetween has been expected to be developed.

DISCLOSURE OF THE INVENTION

An object of the present invention is to provide a rubber-modified aromatic vinyl resin composition which overcomes the defects described above and which provides an excellent gloss and high impact resistance and rigidity all together and has less unevenness in the gloss, and a process for producing the same.

Intensive researches continued by the present inventors have resulted in finding that the object described above can be achieved by blending a rubber-modified aromatic vinyl resin composition in which rubber grains having a specific grain diameter range and grain diameter distribution are dispersed with a silicone oil or a mixed oil of a silicone oil and a fluorine compound oil, and thus coming to complete the present invention.

That is, the present invention relates to a rubber-modified aromatic vinyl resin composition having an excellent balance among a gloss and physical properties such as impact resistance and rigidity, obtained by polymerizing an aromatic vinyl monomer in the presence of a raw material rubber-like polymer, wherein (a) the rubber-like polymer is dispersed in the aromatic vinyl polymer in the form of grains, and the dispersed grains have a weight-average grain diameter falling in a range of 0.4 to 0.8 μm, (b) the dispersed grains have 1.0 μm or less of a 5% value and 0.2 μm or more of a 95% value in a cumulative grain diameter distribution on a weight basis, (c) a ratio of toluene-insoluble matters to a rubber component each of which is contained in the said composition falls in a range of 1.0 to 2.5, and (d) 0.005 to 0.5% by weight of a silicone oil or a mixed oil of 0.005 to 0.5% by weight of a silicone oil and 0.0002 to 0.03% by weight of a fluorine compound oil is contained in the said composition.

Further, the present invention relates to a process for producing the rubber-modified aromatic vinyl resin composition as described above, characterized by adding a silicone oil or a mixed oil of a silicone oil and a fluorine compound oil at an optional stage in steps for producing a rubber-modified aromatic vinyl resin, in which the raw material solution of a raw material rubber-like polymer and an aromatic vinyl monomer is continuously fed into polymerizing equipment constituted by connecting a complete mixing type reactor with a plug flow type reactor in series to carry out the polymerization in the complete mixing type reactor to such an extent that the rubber-like polymer is not dispersed and granulated, and further to carry out the continuous block polymerization in the plug flow type reactor while dispersing and granulating the rubber-like polymer to thereby obtain a polymerization liquid and volatile substances are removed from the polymerization liquid under reduced pressure, followed by pelletization.

The present invention shall be explained below in detail.

The rubber-modified aromatic vinyl resin of the present invention can be obtained by polymerizing the aromatic vinyl monomer in the presence of the rubber-like polymer.

Examples of the aromatic vinyl monomer used in the present invention include styrene, α-methylstyrene, o-methylstyrene, m-methylstyrene, p-methylstyrene, vinylethylbenzene, vinylxylene and vinylnaphthalene, and they can be used alone or in combination of two or more kinds thereof.

Further, in the present invention, other vinyl monomers copolymerizable with the aromatic vinyl monomers, such as methyl methacrylate, ethyl methacrylate, methyl acrylate, ethyl acrylate, acrylonitrile, methacrylonitrile, methacrylic acid, acrylic acid, maleic anhydride, phenyl maleimide and halogen-containing vinyl monomers, may be used alone or in combination of two or more kinds thereof. The amount of these vinyl monomers to be used is usually 30% by weight or less, preferably 10% by weight or less and more preferably 5% by weight or less based on the whole amount of the aromatic vinyl monomers.

The rubber-like polymer is dispersed and contained in the form of grains in the rubber-modified aromatic vinyl resin composition of the present invention.

The kind of the raw material rubber-like polymer used in the present invention shall not specifically be restricted, and there can be used polybutadiene rubber, styrene-butadiene rubber, polyisoprene, butadiene-styrene-isoprene rubber and natural rubber. When polybutadiene is used, it may be either low cis-polybutadiene rubber or high cis-polybutadiene rubber in terms of the micro structure or may be a mixture of low cis-polybutadiene rubber and high cis-polybutadiene rubber. The structure of styrene-butadiene rubber may be a random type, a block type or a taper type. These rubber-like polymers can be used alone or in combination of two or more kinds thereof.

In particular, when polybutadiene rubber or styrene-butadiene rubber is used for the rubber-like polymer in the present invention, a rubber selected from low cis-polybutadiene rubber, styrene-butadiene rubber and a mixture of these rubbers accounts preferably for 70% by weight or more, more preferably 80% by weight or more of the rubber-like polymer in view of elevating more the impact strength.

Low cis-polybutadiene rubber means polybutadiene having a 1,4-cis bond content of 15 to 40%.

The impact strength at low temperatures tends to be reduced as a styrene component contained in styrene-butadiene rubber increases, and therefore the styrene component contained in the styrene-butadiene rubber is 10% by weight or less, preferably 5% by weight or less.

Further, the solution viscosity (SV value) of a 5 wt % solution of the raw material rubber-like polymer used in the present invention in styrene preferably falls in a range of 10 to 50 cps at 25° C. The solution viscosity of 10 cps or lower makes it difficult to control the average grain diameter of the dispersed grains of the rubber-like polymer to 0.4 μm or more and tends to increase the proportion of the dispersed grains having a core-shell structure. Meanwhile, the solution viscosity exceeding 50 cps necessitates introducing facilities such as a high speed stirrer and a disperser for controlling the average grain diameter of the dispersed grains of the rubber-like polymer to 0.8 μm or less to make the installation expensive and tends to reduce the gloss since a grain diameter distribution of the dispersed grains is broadened. Accordingly, it is not preferred.

The rubber-like polymer has to be contained in the resin composition of the present invention in a content falling in a range of 4 to 20% by weight. The content of the rubber-like polymer of less than 4% by weight makes the impact resistance poor, and the content exceeding 20% by weight reduces the rigidity to below a practical range. Accordingly, both are not preferred. In light of the balance between the impact strength and the rigidity, the content of the rubber-like polymer is preferably 6 to 15% by weight.

In order to obtain the resin composition having the intended balance among the gloss and the impact resistance and the rigidity, the dispersed rubber-like polymer has to be controlled to a specific dispersed form. That is, the rubber-like polymer has to be dispersed in the matrix of the aromatic vinyl resin, and the dispersed grains have to have substantially a salami structure.

The salami structure described above means that two or more grains of the aromatic vinyl polymer are included in the dispersed grains, and the term "the dispersed grains have substantially a salami structure" means that the dispersed grains having the salami structure account for 80% or by weight based on the whole dispersed grains. If the proportion of the dispersed grains having the salami structure is less than 80% by weight, the impact resistance is lowered.

Further, the dispersed grains of the rubber-like polymer in which the grain number of the aromatic vinyl polymer included in the dispersed grains is 20 or less account for preferably 70% or more, more preferably 80% or more based on the whole number of the dispersed grains. The grains of the aromatic vinyl polymer included mean the grains having a diameter of 0.03 μm or more among the aromatic vinyl polymer grains included in the dispersed grains of the rubber-like polymer, which is determined as being 0.3 mm or more in an electron microscopic photograph of the rubber modified aromatic vinyl resin which is enlarged by 10000 magnifications and taken by a ultra thin sectioning method. If the dispersed grains in which the grain number of the aromatic vinyl polymer included is 20 or less account for less than 70% based on the whole number of the dispersed grains, the gloss intensity (visibility of the reflected image) of the molded article observed by eyes is extremely reduced.

The dispersed grains of the rubber-like polymer dispersed in the rubber-modified aromatic vinyl resin composition of the present invention has to have a weight-average grain diameter of 0.4 to 0.8 μm, preferably 0.4 to 0.7 μm. The weight-average grain diameter of less than 0.4 μm makes the impact resistance poor, and the grain diameter exceeding 0.8 μm reduces notably the gloss.

The gloss of the molded articles, particularly the gloss intensity observed by eyes is markedly influenced by the grain diameter of the rubber-like polymer grains, and therefore when the grain diameter distribution is broad, for example, when the rubber-like polymer dispersed grains having different average grain diameters are mixed, the gloss intensity observed by eyes is extremely reduced by the component having a larger average grain diameter. Accordingly, with respect to the grain diameter distribution of the grains dispersed in the rubber-modified aromatic vinyl resin composition, the dispersed grains have 1.0 μm or less, preferably 0.9 μm or less of a 5% value and 0.2 μm or more, preferably 0.25 μm or more of a 95% value in a cumulative grain diameter distribution on a weight basis.

Further, the aromatic vinyl polymer grains included in the dispersed grains of the rubber-like polymer have a weight-average diameter falling in a range of preferably 0.10 to 0.25 μm, more preferably 0.13 to 0.25 μm and most preferably 0.14 to 0.22 μm. If the weight-average diameter of the aromatic vinyl polymer grains included deviates from a range of 0.10 to 0.25 μm, the balance between the impact resistance and the gloss is deteriorated, and the satisfactory balance among the physical properties can not be obtained. Accordingly, it is not preferred.

In order to satisfy the balance among the physical properties of the gloss, the impact resistance and the rigidity in the present invention, the ratio (X/R) of toluene-insoluble matters (X % by weight) contained in the composition to the rubber component (R % by weight) has to fall in a range of 1.0 to 2.5, preferably 1.2 to 2.3 and more preferably 1.2 to less than 2.0. Further, the toluene-insoluble matters (X % by weight), the rubber component (R % by weight) and the proportion (Y % by weight) of the dispersed grains having a salami structure based on the whole dispersed grains of the rubber-like polymer falls in a range of $$2.2 < X/R + 80/Y < 3.3$$

preferably $$2.2 < X/R + 80/Y < 3.0$$

If X/R is 1.0 or less or X/R+80/Y is 2.2 or less, the impact resistance is notably reduced. In contrast with this, if X/R is 2.5 or more or X/R +80/Y is 3.3 or more, the rigidity is reduced to a large extent. Thus, the satisfactory balance among the physical properties can not be obtained.

The toluene-insoluble matters mean insoluble matters obtained when one gram of the pellets of the rubber-modified aromatic vinyl resin composition is dissolved in 30 ml of toluene, and they are determined usually by measuring the weight of solid matters obtained by separating the insoluble matters by means of a centrifugal separator and drying them.

In the present invention, a silicone oil or a mixed oil of a silicone oil and a fluorine compound oil has to be added to the rubber-modified aromatic vinyl resin.

The silicone oil used in the present invention is a polymer comprising a repetitive structural unit shown by:

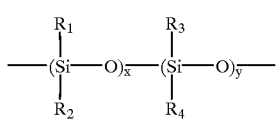

(I)

wherein $R_1$, $R_2$, $R_3$ and $R_4$ represent organic groups such as an alkyl group, a phenyl group and an aralkyl group.

Examples of the silicone oil used in the present invention include dimethylsilicone oil, methylphenylsilicone oil, methylethylsilicone oil, and silicone oils obtained by introducing a hydroxyl group, fluorine, an alkoxyl group, an amino group, an epoxy group, a carboxyl group, a halogen group, an amide group, an ester group and a vinyl group into the ends or the molecular chains of these silicone oils. These silicone oils may be used either alone or in combination of two or more kinds thereof.

The viscosity of the silicone oils shall not specifically be restricted and is preferably 10 to 1000 centistokes at 25° C.

The fluorine compound oil used in the present invention shall not specifically be restricted and may be any one as long as it is liquid at ordinary temperature. Examples thereof include fluorocarbon compound oils, perfluoropolyethers and fluoroalkyl oligomers.

The silicone oils used in the present invention have to have a surface tension falling in a range of 19.5 to 22.0 dyne/cm, preferably 19.8 to 21.5 dyne/cm and more preferably 20.1 to 21.2 dyne/cm at 25° C. when only the silicone oils are used alone. In this case, the silicone oils are optimally dispersed into the resin, and the effect of enhancing the impact resistance is notably exhibited. If the surface tension of the silicone oils at 25° C. deviates from a range of 19.5 to 22.0 dyne/cm, the impact resistance is extremely reduced, and therefore the effects of the present invention are insufficiently exhibited.

In this case, the content of the silicone oil contained in the rubber-modified aromatic resin composition falls in a range of 0.005 to 0.5% by weight, preferably 0.005 to 0.3% by weight and more preferably 0.005 to 0.2% by weight. If the content of the silicone oil is smaller than 0.005% by weight, the effect of elevating the impact resistance is reduced, and if it is larger than 0.5% by weight, not only the effect of adding the silicone oil is at the ceiling thereof but also brought about in a certain case is a problem that the silicone oil bleeds out on the surface of the molded article when the resin is subjected to molding and deteriorates the appearance.

On the other hand, when a mixed oil of a silicone oil and a fluorine compound oil is used, the silicone oil is selected from those having a surface tension falling in a range of 18.0 to 25.0 dyne/cm, preferably 22.0 to 25.0 dyne/cm at 25° C. The fluorine compound oil is preferably at least one selected from those having a surface tension falling in a range of 15.0 to 25.0 dyne/cm, preferably 17.0 to 23.0 dyne/cm at 25° C.

In this case, the content of the silicone oil contained in the rubber-modified aromatic vinyl resin composition has to fall in a range of 0.005 to 0.5% by weight. Considering the stability of the effect of making up the impact resistance, the content of the silicone oil falls preferably in a range of 0.03 to 0.5% by weight. The content of less than 0.005% by weight exhibits insufficiently the effect of making up the impact resistance even if the fluorine compound oil coexists, and the content exceeding 0.5% by weight causes the silicone oil to bleed out on the surface of the molded article to bring about a reduction in the gloss. The fluorine compound oil has to be contained in the resin composition in a proportion of 0.0002 to 0.03% by weight. Considering the stability of the effect of making up the impact resistance, the content of the fluorine compound oil falls preferably in a range of 0.0005 to 0.02% by weight. The content of less than 0.0002% by weight exhibits insufficiently the effect of making up the impact resistance even if the silicone oil coexists, and the content exceeding 0.03% by weight not only allows the effect of adding the fluorine compound oil to be at the ceiling thereof but also leads to the cost-up of the resin composition and therefore is not preferred.

Further, when the mixed oil is used, the weight ratio of the silicone oil to the fluorine compound oil falls preferably in a range of 99:1 to 70:30.

In the production of the rubber-modified aromatic vinyl resin composition of the present invention, the silicone oil or the mixed oil of the silicone oil and the fluorine compound oil can be added at an optional stage of the production process thereof. It may be added to, for example, the raw materials before starting the polymerization or the polymerization liquid in the course of the polymerization, or may be added at a pelletizing step after finishing the polymerization. Further, it can be added by means of a kneading machine or added in a molding machine. What may be used as a method of adding it after finishing the polymerization is, for instance, a method in which a master pellet having a high concentration of the silicone oil or the mixed oil of the silicone oil and the fluorine compound oil is produced from the silicone oil or the mixed oil of the silicone oil and the fluorine compound oil and the aromatic vinyl resin or the rubber-modified aromatic vinyl resin, and in which this master pellet is blended with the rubber-modified aromatic vinyl resin.

Higher fatty acids such as stearic acid, metal salts of higher fatty acids such as zinc stearate and calcium stearate and amides of higher fatty acids such as ethylenebisstearoamide may be used as a lubricant for the rubber-modified aromatic resin composition of the present invention alone or in a mixture of two or more kinds thereof. In general, the adding amount of the lubricant is 0.01 to 1.0% by weight.

The composition of the present invention can be blended, if necessary, with various additives such as, internal lubricants, plasticizers, antioxidants, UV absorbers, antistatic agents, mold releasing agents, flame retardants, dyes and pigments. These additives can be added at optional stages. They may be added, for example, at a stage of molding the molded article or at a polymerization stage of the product.

The process for producing the rubber-modified aromatic vinyl resin composition of the present invention shall not specifically be restricted, and preferred is a method in which the raw material solution prepared by adding, if necessary, an organic peroxide catalyst, a chain transfer agent and an organic solvent to the raw material rubber-like polymer and the aromatic vinyl monomer each described above is continuously fed into polymerizing equipment constituted by connecting a complete mixing type reactor with one or, if necessary, plural plug flow type reactors in series to carry out the polymerization in the complete mixing type reactor to such an extent that the rubber-like polymer is not dispersed and granulated, and further to continue the polymerization in the plug flow type reactor to disperse and granulate the rubber-like polymer.

Without using the complete mixing type reactor, it is difficult to control the ratio of the toluene-insoluble matters to the rubber component each of which is contained in the resin composition to 2.5 or less. Further, even when the complete mixing type reactor is used, the polymerization taken place at this stage over a range in which the rubber-like polymer is not dispersed and granulated not only increases markedly the average grain diameter of the dispersed grains but also tends to reduce the impact strength of the resulting composition. Accordingly, it is not preferred.

The resulting polymerization reaction liquid is subjected to removal of volatile substances under reduced pressure and then to pelletization. The silicone oil or the mixed oil of the silicone oil and the fluorine compound oil is added at an optional stage in the course of the polymerizing step described above or at a pelletizing stage, whereby the rubber-modified aromatic vinyl resin composition of the present invention can be obtained.

BEST MODE FOR CARRYING OUT THE INVENTION

The embodiments of the present invention shall be explained below in further detail with reference to specific examples and comparative examples, but the present invention shall by no means be restricted by these examples.

The physical properties of the resins in the examples were determined by the methods shown below:

(1) Toluene-insoluble matters:

After dissolving one gram of the rubber-modified aromatic vinyl resin composition in 30 ml of toluene, centrifugal settling is carried out at a revolution number of 14000 rpm at 20° C. for 30 minutes by means of a centrifugal separator (H-2000B manufactured by Kokusan Centrifugal Separator Co., Ltd.) using a rotor having a radius of 11.4 cm, and the supernatant is removed to separate insoluble matters. After drying the insoluble matters to remove toluene, the weight of the toluene-insoluble matters are measured to determine a toluene-insoluble content (% by weight) by the following equation:

toluene-insoluble content (% by weight)=(weight of the toluene-insoluble matters/weight of the resin composition)×100

(2) Rubber component:

Determined by a Wijs method.

(3) Measurement of rubber grain diameter and grain diameter distribution:

The resin is dyed with osmium tetraoxide, and the electron microscopic photograph is taken by a ultrathin sectioning method. In the photograph enlarged by 10000 magnifications, the grain diameters of 1000 or more dispersed rubber grains are measured to determine the weight-average grain diameter by the following equation:

average grain diameter=$\Sigma niDi^4/\Sigma niDi^3$ wherein ni is a number of the rubber-like polymer grains having a grain diameter Di).

The weight of the rubber grains are cumulated relative to the diameter from larger ones; the grain diameter that the cumulative rate is 5% of the whole weight is designated as a 5% value in a cumulative grain diameter distribution, and the grain diameter that the cumulative rate is 95% of the whole weight is designated as a 95% value in the cumulative grain diameter distribution.

(4) Izod (IZ) impact strength:

Determined based on JIS 6871 (with a notch).

(5) Flexural elastic modulus:

Determined based on ASTM D 790.

(6) Gloss:

Determined based on JIS K 7105.

(7) Image visibility:

Determined based on JIS K 7105.

EXAMPLE 1

Twenty two parts by weight of ethylbenzene and 0.015 part by weight of di-tertiarybutyl peroxycyclohexane were added to 100 parts by weight of a mixed solution dissolving 90 parts by weight of styrene and 10 parts by weight of low cis-polybutadiene rubber (SV value: 35 cps) to be dissolved, whereby a raw material solution was prepared. The raw material solution thus prepared was continuously fed into the first complete mixing vessel type reactor having a content volume of 25 parts by volume at a feed rate of 22 parts by volume/hour to carry out the polymerization at 110° C. Then, the polymerization liquid was continuously charged into the second reactor which was a plug flow type tower reactor of 60 parts by volume equipped with a stirrer to carry out the polymerization. The polymerization temperature at the outlet of the second reactor was controlled to 140° C. The revolution number of the stirrer was set to 150 revolutions/minute in both the first and second reactors.

The rubber-like polymer remained in such condition that it was not yet dispersed and granulated at the outlet of the first reactor, and as a result of carrying out the polymerization in the second reactor while stirring, the polymerization liquid was in the condition that the dispersion and granulation were finished at the outlet of the second reactor.

Then, the polymerization liquid described above was continuously charged into the third reactor comprising a plug flow type reactor having a content volume of 20 parts by volume, and the polymerization was continued while controlling the outlet polymerization temperature to 160° C. to allow the polymerization to proceed until the polymerization conversion rate of styrene reached 85%. After removing volatile substances from this polymerization liquid under reduced pressure, 0.05 part by weight of a silicone oil (surface tension: 20.9 dyne/cm) and 0.5 part by weight of liquid paraffin were added to 100 parts by weight of the resin, and then the resin was pelletized.

The dispersed grains of the rubber-like polymer contained in the resin composition thus obtained had substantially a salami structure, and the measurement results of the physical property values of the resin are shown in Table 1.

EXAMPLE 2

Twenty two parts by weight of ethylbenzene was added to 100 parts by weight of a mixed solution dissolving 90 parts by weight of styrene and 10 parts by weight of styrene-butadiene rubber (SV value: 25 cps) to be dissolved, whereby a raw material solution was prepared. The raw material solution thus prepared was continuously fed into the first complete mixing vessel type reactor having a content volume of 25 parts by volume at a feed rate of 22 parts by volume/hour to carry out the polymerization at 123° C. Then, the polymerization liquid was continuously charged into the second reactor which was a plug flow type tower reactor of 60 parts by volume equipped with a stirrer to carry out the polymerization. The polymerization temperature at the outlet of the second reactor was controlled to 140° C. The revolution number of the stirrer was set to 150 revolutions/minute in both the first and second reactors.

The rubber-like polymer remained in such condition that it was not yet dispersed and granulated at the outlet of the first reactor, and as a result of carrying out the polymerization in the second reactor while stirring, the polymerization liquid was in the condition that the dispersion and granulation were finished at the outlet of the second reactor.

Then, the polymerization liquid described above was continuously charged into the third reactor comprising a plug flow type reactor having a content volume of 20 parts by volume, and the polymerization was continued while controlling the polymerization temperature to 160° C. to allow the polymerization to proceed until the polymerization conversion rate of styrene reached 77%.

After removing volatile substances from this polymerization liquid under reduced pressure, 0.3 part by weight of a silicone oil (surface tension: 20.9 dyne/cm) and 0.5 part by weight of liquid paraffin were added to 100 parts by weight of the resin, and then the resin was pelletized.

The measurement results of the physical property values of the resin thus obtained are shown in Table 1.

EXAMPLE 3

The polymerization was carried out under the same conditions as in Example 2, except that used was a raw material solution prepared by adding 22 parts by weight of ethylbenzene and 0.01 part by weight of tertiary-dodecyl mercaptan to 100 parts by weight of a mixed solution dissolving 90 parts by weight of styrene, 5 parts by weight of styrene-butadiene rubber (SV value: 25 cps) and 5 parts by weight of low cis-polybutadiene rubber (SV value: 35 cps). The final polymerization conversion rate of styrene was 74%.

The measurement results of the physical property values of the resin thus obtained are shown in Table 1.

EXAMPLE 4

The polymerization was carried out under the same conditions as in Example 1, except that used was a raw material solution prepared by adding 22 parts by weight of ethylbenzene, 0.01 part by weight of tertiarydodecyl mercaptan and 0.015 part by weight of di-tertiarybutyl peroxycyclohexane to 100 parts by weight of a mixed solution dissolving 92.5 parts by weight of styrene and 7.5 parts by weight of low cis-polybutadiene rubber (SV value: 35 cps). The final polymerization conversion rate of styrene was 83%.

The measurement results of the physical property values of the resin thus obtained are shown in Table 1.

EXAMPLE 5

The polymerization was carried out under the same conditions as in Example 2, except that used was a raw material solution prepared by adding 22 parts by weight of ethylbenzene to 100 parts by weight of a mixed solution dissolving 92 parts by weight of styrene, 7.5 parts by weight of low cis-polybutadiene rubber (SV value: 35 cps) and 2.5 parts by weight of high cis-polybutadiene rubber (SV value: 80 cps) and that the revolution number of the stirrer installed in the second reactor was changed to 260 revolutions/minute.

Added to 100 parts by weight of the resin were 0.01 part by weight of a silicone oil (surface tension: 21.5 dyne/cm) and 0.5 part by weight of liquid paraffin, and then the resin was pelletized.

The measurement results of the physical property values of the resin thus obtained are shown in Table 1.

TABLE 1

|  |  | Example | | | | |
|---|---|---|---|---|---|---|
|  |  | 1 | 2 | 3 | 4 | 5 |
| Content of low cis-polybutadiene rubber in raw material rubber | wt % | 100 | 0 | 50 | 100 | 75 |
| Content of high cis-polybutadiene rubber in raw material rubber | wt % | 0 | 0 | 0 | 0 | 25 |
| Content of styrene-butadiene rubber in raw material rubber | wt % | 0 | 100 | 50 | 0 | 0 |
| Content of styrene in styrene-butadiene rubber | wt % | — | 2.5 | 5 | — | — |
| SV value |  | 35 | 25 | 30 | 35 | 50 |
| Content of rubber in Product | wt % | 12.0 | 13.0 | 13.5 | 9.0 | 12.0 |
| Average grain diameter | μm | 0.58 | 0.50 | 0.72 | 0.62 | 0.58 |
| 5% value in cumulative grain diameter distribution | μm | 0.72 | 0.69 | 0.94 | 0.82 | 0.75 |
| 95% value in cumulative grain diameter distribution | μm | 0.28 | 0.23 | 0.37 | 0.33 | 0.26 |
| Ratio of toluene-insoluble matters to rubber component |  | — | 2.0 | 1.6 | 1.7 | 2.3 | 1.5 |
| Surface tension of silicone oil | dyne/cm | 20.9 | 20.9 | 20.9 | 20.9 | 21.5 |
| Addition amount of silicone oil | weight part | 0.05 | 0.3 | 0.05 | 0.05 | 0.01 |
| Izod impact strength | kgf · cm/cm | 13.5 | 12.2 | 15.2 | 10.2 | 10.1 |
| Flexural elastic modulus | kgf/mm$^2$ | 213 | 228 | 205 | 218 | 223 |
| Gloss (JIS-K7105) | % | 100.5 | 101.7 | 100.2 | 101.1 | 100.8 |
| Image visibility (JIS-K7105) | % | 88.4 | 92.0 | 85.9 | 89.2 | 89.2 |

Comparative Example 1

The polymerization was carried out under the same conditions as in Example 1, except that the revolution number of the stirrer installed in the second reactor was changed to 380 revolutions/minute.

The measurement results of the physical property values of the resin thus obtained are shown in Table 2.

Comparative Example 2

Twenty two parts by weight of ethylbenzene and 0.015 part by weight of di-tertiarybutyl peroxycyclohexane were added to 100 parts by weight of a mixed solution dissolving 92 parts by weight of styrene and 8 parts by weight of low cis-polybutadiene rubber (SV value: 85 cps) to be dissolved, whereby a raw material solution was prepared. The raw material solution thus prepared was continuously fed into the first complete mixing vessel type reactor having a content volume of 25 parts by volume at a feed rate of 22 parts by volume/hour to carry out the polymerization at 128° C. Then, the polymerization liquid was continuously charged into the second reactor which was a plug flow type tower reactor of 60 parts by volume equipped with a stirrer to carry out the polymerization. The polymerization temperature at the outlet of the second reactor was controlled to 140° C.

The revolution numbers of the stirrers were set to 400 revolutions/minute in the first reactor and 150 revolutions/minute in the second reactor. The polymerization liquid was in the condition that the dispersion and granulation of the rubber-like polymer had already been finished at the outlet of the first reactor.

Then, the whole amount of the polymerization liquid described above was continuously charged into the third reactor comprising a plug flow type reactor having a content volume of 20 parts by volume, and the polymerization was continued while controlling the polymerization temperature to 160° C. to allow the polymerization to proceed until the polymerization conversion rate of styrene reached 80%. After removing volatile substances from this polymerization liquid under reduced pressure, 0.05 part by weight of a silicone oil (surface tension: 20.9 dyne/cm) and 0.5 part by weight of liquid paraffin were added to 100 parts by weight of the resin, and then the resin was pelletized.

The measurement results of the physical property values of the resin thus obtained are shown in Table 2.

Comparative Example 3

Twenty two parts by weight of ethylbenzene and 0.025 part by weight of di-tertiarybutyl peroxycyclohexane were added to 100 parts by weight of a mixed solution dissolving 90 parts by weight of styrene and 10 parts by weight of low cis-polybutadiene rubber (SV value: 35 cps) to be dissolved, whereby a raw material solution was prepared. The raw material solution thus prepared was continuously fed into the first reactor which was a plug flow type tower reactor of 60 parts by volume equipped with a stirrer at a feed rate of 22 parts by volume/hour to carry out the polymerization.

The polymerization temperature in the first reactor was controlled so that such a temperature gradient that the temperature was elevated along the direction of the flow was generated in a range of 118 to 140° C. The revolution number of the stirrer was set to 120 revolutions/minute. As a result of carrying out the polymerization in the first reactor while stirring, the polymerization liquid was in the condition that the dispersion and granulation were finished at the outlet of the first reactor.

Then, the polymerization liquid described above was continuously charged into the second reactor constituted by connecting three plug flow type reactors having a content volume of 20 parts by volume in series, and the polymerization was continued while controlling the polymerization temperature to 160° C. to allow the polymerization to proceed until the polymerization conversion rate of styrene reached 87%. After removing volatile substances from this polymerization liquid under reduced pressure, 0.05 part by weight of a silicone oil (surface tension: 20.9 dyne/cm) and 0.5 part by weight of liquid paraffin were added to 100 parts by weight of the resin, and then the resin was pelletized.

The measurement results of the physical property values of the resin thus obtained are shown in Table 2.

Comparative Example 4

The polymerization was carried out under the same conditions as in Example 2, except that used was a raw material solution prepared by adding 22 parts by weight of ethylbenzene to 100 parts by weight of a mixed solution dissolving 92 parts by weight of styrene and 9 parts by weight of high cis-polybutadiene rubber (SV value: 80 cps) and that the revolution number of the stirrer installed in the second reactor was changed to 200 revolutions/minute.

The measurement results of the physical property values of the resin thus obtained are shown in Table 2.

Comparative Example 5

The polymerization was carried out under the same conditions as in Example 1, except that the adding amount of a silicone oil (surface tension: 20.9 dyne/cm) was changed to 0.001 part by weight per 100 parts by weight of the resin.

The measurement results of the physical property values of the resin thus obtained are shown in Table 2.

TABLE 2

|  |  | Comparative Example | | | | |
|---|---|---|---|---|---|---|
|  |  | 1 | 2 | 3 | 4 | 5 |
| Content of low cis-polybutadiene rubber in raw material rubber | wt % | 100 | 100 | 100 | 0 | 100 |
| Content of high cis-polybutadiene rubber in raw material rubber | wt % | 0 | 0 | 0 | 100 | 0 |
| Content of styrene-butadiene rubber in raw material rubber | wt % | 0 | 0 | 0 | 0 | 0 |
| Content of styrene in styrene-butadiene rubber | wt % | — | — | — | — | — |
| SV value | — | 35 | 85 | 35 | 80 | 35 |
| Content of rubber in Product | wt % | 12.5 | 10.0 | 11.5 | 10.5 | 12.0 |
| Average grain diameter | μm | 0.32 | 1.05 | 0.56 | 0.90 | 0.58 |
| 5% value in cumulative grain diameter distribution | μm | 0.45 | 1.52 | 0.70 | 1.40 | 0.72 |
| 95% value in cumulative grain diameter distribution | μm | 0.15 | 0.55 | 0.25 | 0.42 | 0.28 |
| Ratio of toluene-insoluble matters to rubber component | — | 1.9 | 2.4 | 3.2 | 1.6 | 2.0 |
| Surface tension of silicone oil | dyne/cm | 20.9 | 20.9 | 20.9 | 20.9 | 20.9 |
| Addition amount of silicone oil | weight part | 0.05 | 0.05 | 0.05 | 0.05 | 0.001 |
| Izod impact strength | kgf · cm/cm | 2.9 | 13.2 | 11 | 11.3 | 4.2 |
| Flexural elastic modulus | kgf/mm$^2$ | 238 | 193 | 187 | 203 | 212 |
| Gloss (JIS-K7105) | % | 101.9 | 88.2 | 99.7 | 94.2 | 100.6 |
| Image visibility (JIS-K7105) | % | 93.2 | 32.5 | 85.3 | 63.2 | 88.7 |

Reference Example 1

A raw material solution prepared by adding 20 parts by weight of ethylbenzene to 100 parts by weight of a mixed solution dissolving styrene and polybutadiene rubber was continuously fed into the first complete mixing vessel type reactor having a content volume of 25 parts by volume at a feed rate of 22 parts by volume/hour to carry out the polymerization with heating. Then, the whole amount of the polymerization liquid was continuously charged into the second reactor which was a plug flow type tower reactor of 60 parts by volume equipped with a stirrer to carry out the polymerization.

The rubber-like polymer remained in such condition that it was not yet dispersed and granulated at the outlet of the first reactor, and as a result of carrying out the polymerization in the second reactor while stirring, the polymerization liquid was in the condition that the dispersion and granulation were finished at the outlet of the second reactor.

Then, the whole amount of the polymerization liquid described above was continuously charged into the third reactor comprising a plug flow type reactor having a content volume of 20 parts by volume to continue the polymerization, and after removing volatile substances from this polymerization liquid under reduced pressure, the resin was pelletized.

Obtained by the method described above were seven kinds of the rubber-modified aromatic vinyl resins in which the average grain diameters of the dispersed grains of the rubber-like polymers fell in a range of 0.30 to 1.0 μm and the ratios of the toluene insoluble matters to the rubber component fell in a range of 1.5 to 2.4.

Reference Example 2

A raw material solution prepared by adding 15 parts by weight of ethylbenzene to 100 parts by weight of a mixed solution dissolving styrene and polybutadiene rubber was continuously fed into the first plug flow type tower reactor having a content volume of 30 parts by volume equipped with a stirrer at a feed rate of 22 parts by volume/hour to carry out the polymerization with heating. Then, the whole amount of the polymerization liquid was continuously charged into the second reactor which was a plug flow type tower reactor of 60 parts by volume equipped with a stirrer to carry out the polymerization.

Then, the whole amount of the polymerization liquid described above was continuously charged into the third reactor comprising a plug flow type reactor having a content volume of 20 parts by volume to continue the polymerization, and after removing volatile substances from this polymerization liquid under reduced pressure, the resin was pelletized.

Obtained by the method described above was the rubber-modified aromatic vinyl resins in which the average grain diameter of the dispersed grains of the rubber-like polymer was 0.60 μm and the ratio of the toluene-insoluble matters to the rubber component was 2.8.

EXAMPLES 6 to 9 and Comparative Examples 6 to 9

A silicone oil having a surface tension of 20.9 dyne/cm at 25° C. was added in a proportion of 0.05% by weight to eight kinds of the rubber-modified aromatic vinyl resins obtained in Reference Examples 1 and 2 and the resin compositions were kneaded by means of an extruder.

The physical property values of the resin compositions thus obtained are shown in Table 3.

It can be found that if the average grain diameter of the dispersed grains of the rubber-like polymers is less than 0.4 μm, the IZ impact strength is notably reduced, and if it exceeds 0.8 μm, the image visibility is markedly reduced. It can be found as well that the image visibility is liable to be affected by the component having the larger grain diameter and that when the 5% value in the cumulative grain diameter distribution on a weight basis exceeds 1.0 μm, the image visibility is reduced though the average grain diameters fall in a range of 0.4 to 0.8 μm.

Further, the ratio of the toluene insoluble matters to the rubber component is an important factor for improving the balance between the IZ impact strength and the flexural elastic modulus, and it can be found that if the ratio exceeds 2.5, the flexural elastic modulus is lowered, and therefore the satisfactory balance between the physical properties can not be obtained.

Comparative Example 10

A rubber-modified aromatic monovinyl resin with an average grain diameter of 0.28 μm having a core/shell structure, which was obtained by polymerizing styrene monomers while stirring in the presence of a styrene-butadiene block copolymer and 0.05% by weight of silicone oil having a surface tension of 20.9 dyne/cm at 25° C. were added to the rubber-modified aromatic vinyl resin obtained in Reference Example 1 and the resin composition was kneaded by means of an extruder.

The physical property values of the resin composition thus obtained are shown in Table 3.

It can be found that since the rubber grains having a salami structure account for 80% by weight or less, the IZ impact strength is reduced and therefore the satisfactory balance among the physical properties can not be obtained.

TABLE 3

|  | Unit | Example | | | | Comparative Example | | | | |
| --- | --- | --- | --- | --- | --- | --- | --- | --- | --- | --- |
|  |  | 6 | 7 | 8 | 9 | 6 | 7 | 8 | 9 | 10 |
| Rubber content in product | weight % | 13.2 | 14.5 | 11.5 | 9.2 | 12.5 | 10.0 | 12.0 | 13.0 | 12.8 |
| Average rubber grain diameter | μm | 0.59 | 0.43 | 0.64 | 0.70 | 0.30 | 1.00 | 0.75 | 0.60 | 0.43 |
| 5% value in cumulative grain diameter distribution | μm | 0.75 | 0.62 | 0.82 | 0.95 | 0.45 | 1.50 | 1.10 | 0.95 | 0.82 |
| 95% value in cumulative grain diameter distribution | weight μm | 0.29 | 0.25 | 0.33 | 0.35 | 0.17 | 0.60 | 0.20 | 0.30 | 0.15 |
| Proportion of rubber grains having salami structure | weight % | 96 | 90 | 95 | 97 | 88 | 98 | 90 | 96 | 52 |
| Toluene-insoluble matters/rubber component | — | 2.0 | 1.6 | 1.5 | 2.1 | 1.8 | 2.2 | 2.4 | 2.8 | 2.3 |
| X/R + 80/Y | — | 2.8 | 2.5 | 2.3 | 2.9 | 2.7 | 3.0 | 3.3 | 3.6 | 3.8 |
| Proportion of 20 grains or | % | 94 | 88 | 83 | 90 | 90 | 65 | 74 | 87 | 93 |

TABLE 3-continued

|  | Unit | Example | | | | Comparative Example | | | | |
|---|---|---|---|---|---|---|---|---|---|---|
|  |  | 6 | 7 | 8 | 9 | 6 | 7 | 8 | 9 | 10 |
| less of included PS |  |  |  |  |  |  |  |  |  |  |
| Surface tension of silicone oil | dyne/cm | 20.9 | 20.9 | 20.9 | 20.9 | 20.9 | 20.9 | 20.9 | 20.9 | 20.9 |
| Addition amount of silicone oil | weight % | 0.05 | 0.05 | 0.05 | 0.05 | 0.05 | 0.05 | 0.05 | 0.05 | 0.05 |
| Izod impact strength (¼ inch) | kgf · cm/cm | 13.8 | 10.5 | 13.0 | 11.5 | 3.0 | 13.0 | 12.0 | 12.5 | 6.4 |
| Flexural elastic modulus | kgf/mm² | 210 | 226 | 220 | 208 | 245 | 203 | 215 | 182 | 220 |
| Gloss | % | 101.0 | 102.2 | 100.8 | 100.3 | 102.2 | 86.3 | 99.1 | 99.5 | 100.9 |
| Image visibility | % | 89.2 | 96.7 | 85.9 | 84.2 | 96.7 | 42.6 | 50.9 | 81.7 | 91.7 |

EXAMPLES 10 to 11, Comparative Example 11 and Reference Examples 3 to 4

Silicone oil was added to the rubber-modified aromatic vinyl resin (the resin prepared in Example 6) having an average grain diameter of 0.59 μm obtained in Reference Example 1 and the resin compositions were kneaded by means of an extruder.

The physical property values of the resin compositions thus obtained are shown in Table 4.

It can be found that the IZ impact strength is reduced by decreasing the adding amount of silicone oil to 0.001% by weight.

Further, the ratio of the toluene-insoluble matters to the rubber component is an important factor for improving the balance between the IZ impact strength and the flexural elastic modulus, and it can be found that if the ratio exceeds 2.5, the flexural elastic modulus is lowered, and therefore the satisfactory balance among the physical properties can not be obtained.

Comparative Example 16

A rubber-modified aromatic monovinyl resin with an average grain diameter of 0.28 μm having a core/shell structure, which was obtained by polymerizing styrene monomers while stirring in the presence of a styrene-

TABLE 4

|  | Unit | Example | | Comparative Example | Reference Example | |
|---|---|---|---|---|---|---|
|  |  | 10 | 11 | 11 | 3 | 4 |
| Surface tension of silicone oil | dyne/cm | 20.9 | 20.6 | 20.9 | 19.2 | 24.1 |
| Addition amount of silicone oil | weight % | 0.02 | 0.3 | 0.001 | 0.05 | 0.05 |
| Izod impact strength (¼ inch) | kgf · cm/cm | 13.0 | 13.9 | 4.3 | 3.6 | 4.9 |
| Flexural elastic modulus | kgf/mm² | 210 | 210 | 212 | 212 | 211 |
| Gloss | % | 100.9 | 101.2 | 101.0 | 100.8 | 100.9 |
| Image visibility | % | 89.2 | 90.9 | 89.2 | 88.4 | 89.2 |

EXAMPLES 12 to 15 and Comparative Examples 12 to 15

A silicone oil of 0.05% by weight having a surface tension of 24.1 dyne/cm at 25° C. and a fluorine compound oil of 0.0025% by weight having a surface tension of 17.7 dyne/cm at 25° C. were added to eight kinds of the rubber-modified aromatic vinyl resins obtained in Reference Examples 1 and 2 and the resin compositions were kneaded by means of an extruder.

The physical property values of the resin compositions thus obtained are shown in Table 5.

It can be found that if the average grain diameter of the dispersed grains of the rubber-like polymers is less than 0.4 μm, the IZ impact strength is notably reduced, and if it exceeds 0.8 μm, the image visibility is markedly lowered. It can be found as well that the image visibility is liable to be affected by the component having the larger grain diameter and that when the 5% value in the cumulative grain diameter distribution on a weight basis exceeds 1.0 μm, the image visibility is reduced though the average grain diameters fall in a range of 0.4 to 0.8 μm.

butadiene block copolymer, 0.05% by weight of silicone oil having a surface tension of 24.1 dyne/cm at 25° C. and 0.0025% by weight of a fluorine compound oil having a surface tension of 17.7 dyne/cm at 25° C. were added to the rubber-modified aromatic vinyl resin obtained in Reference Example 1 and the resin composition was kneaded by means of an extruder.

The physical property values of the resin composition thus obtained are shown in Table 5.

It can be found that since the rubber grains having a salami structure account for 80% by weight or less, the IZ impact strength is reduced and therefore the satisfactory balance among the physical properties can not be obtained.

EXAMPLES 16 to 17 and Comparative Examples 17 to 18

A silicone oil and a fluorine compound oil were added to the rubber-modified aromatic vinyl resin (the resin prepared in Example 6) having an average grain diameter of 0.59 μm obtained in Reference Example 1 and the resin compositions were kneaded by means of an extruder.

The physical property values of the resin compositions thus obtained are shown in Table 6.

It can be found that when the silicone oil and the fluorine compound oil are used in combination, the IZ impact strength is enhanced as compared with the case where the fluorine compound oil is added alone.

TABLE 5

|  | Unit | Example | | | | Comparative Example | | | | |
|---|---|---|---|---|---|---|---|---|---|---|
|  |  | 12 | 13 | 14 | 15 | 12 | 13 | 14 | 15 | 16 |
| Rubber content in product | weight % | 13.2 | 14.5 | 11.5 | 9.2 | 12.5 | 10.0 | 12.0 | 13.0 | 12.8 |
| Average rubber grain diameter | μm | 0.59 | 0.43 | 0.64 | 0.70 | 0.30 | 1.00 | 0.75 | 0.60 | 0.43 |
| 5% value in cumulative grain diameter distribution | μm | 0.75 | 0.62 | 0.82 | 0.95 | 0.45 | 1.50 | 1.10 | 0.95 | 0.82 |
| 95% value in cumulative grain diameter distribution | μm | 0.29 | 0.25 | 0.33 | 0.35 | 0.17 | 0.60 | 0.20 | 0.30 | 0.15 |
| Proportion of rubber grains having salami structure | % | 96 | 90 | 95 | 97 | 88 | 98 | 90 | 96 | 52 |
| Toluene-insoluble matters/rubber component | — | 2.0 | 1.6 | 1.5 | 2.1 | 1.8 | 2.2 | 2.4 | 2.8 | 2.3 |
| Proportion of 20 grains or less of included PS | % | 94 | 88 | 83 | 90 | 90 | 65 | 74 | 87 | 93 |
| X/R + 80/Y | — | 2.8 | 2.5 | 2.3 | 2.9 | 2.7 | 3.0 | 3.3 | 3.6 | 3.8 |
| Surface tension of silicone oil | dyne/cm | 24.1 | 24.1 | 24.1 | 24.1 | 24.1 | 24.1 | 24.1 | 24.1 | 24.1 |
| Surface tension of fluorine compound oil | dyne/cm | 17.7 | 17.7 | 17.7 | 17.7 | 17.7 | 17.7 | 17.7 | 17.7 | 17.7 |
| Content of silicone oil | weight % | 0.05 | 0.05 | 0.05 | 0.05 | 0.05 | 0.05 | 0.05 | 0.05 | 0.05 |
| Content of fluorine compound oil | weight % | 0.0025 | 0.0025 | 0.0025 | 0.0025 | 0.0025 | 0.0025 | 0.0025 | 0.0025 | 0.0025 |
| Izod impact strength (¼ inch) | kgf · cm/cm | 13.5 | 10.3 | 12.5 | 11.6 | 3.0 | 12.8 | 12.0 | 12.0 | 6.2 |
| Flexural elastic modulus | kgf/mm² | 210 | 225 | 220 | 210 | 245 | 202 | 215 | 180 | 220 |
| Gloss | % | 101.0 | 102.1 | 100.7 | 100.4 | 102.3 | 86.2 | 99.3 | 99.7 | 100.8 |
| Image visibility | % | 89.2 | 96.5 | 85.8 | 84.2 | 96.5 | 42.5 | 50.7 | 81.5 | 91.7 |

TABLE 6

|  | Unit | Example | | Comparative Example | |
|---|---|---|---|---|---|
|  |  | 16 | 17 | 17 | 18 |
| Surface tension of silicone oil | dyne/cm | 20.9 | 24.1 | — | 24.1 |
| Surface tension of fluorine compound oil | dyne/cm | 17.7 | 17.7 | 17.7 | 17.7 |
| Content of silicone oil | weight % | 0.0475 | 0.0475 | 0 | 1.0 |
| Content of fluorine Compound oil | weight % | 0.0025 | 0.01 | 0.05 | 0.0025 |
| Izod impact strength (¼ inch) | kgf · cm/cm | 14.0 | 13.8 | 9.3 | 12.5 |
| Flexural elastic modulus | kgf/mm² | 210 | 208 | 207 | 205 |
| Gloss | % | 101.2 | 101.0 | 101.4 | 97.0 |
| Image visibility | % | 89.4 | 89.0 | 89.5 | 85.0 |

Industrial Applicability

The rubber-modified vinyl resin composition of the present invention is excellent in a gloss, impact resistance and rigidity and therefore can be used in a wide range of, for example, housing materials for products in the electrical and electronic fields. In particular, it is suited for parts of products for which a good appearances are required.

What is claimed is:

1. A rubber-modified aromatic vinyl resin composition comprising mainly 80 to 96% by weight of an aromatic vinyl polymer and 20 to 4% by weight of a rubber-like polymer, wherein (a) the rubber-like polymer, which has substantially a salami structure, is dispersed in the aromatic vinyl polymer in the form of grains and the dispersed grains have a weight-average grain diameter falling in a range of 0.4 to 0.8 μm, (b) the dispersed grains have 1.0 μm or less of a 5% value and a 0.2 μm or more of a 95% value in a cumulative grain diameter distribution on a weight basis, (c) a ratio of toluene-insoluble matters to a rubber component each of which are contained in said composition falls in a range of 1.0 to 2.5, and (d) 0.005 to 0.5% by weight of a silicone oil is contained in said composition.

2. A rubber-modified aromatic vinyl resin composition comprising mainly 80 to 96% by weight of an aromatic vinyl polymer and 20 to 4% by weight of a rubber-like polymer, wherein (a) the rubber-like polymer is dispersed in the aromatic vinyl polymer in the form of grains, and the dispersed grains have a weight-average grain diameter falling in a range of 0.4 to 0.8 μm, (b) the dispersed grains have 1.0 μm or less of a 5% value and 0.2 μm or more of a 95% value in a cumulative grain diameter distribution on a weight basis, (c) a ratio of toluene-insoluble matters to a rubber component each of which is contained in said composition falls in a range of 1.0 to 2.5, and (d) a mixed oil of 0.005 to 0.5% by weight of a silicone oil and 0.0002 to 0.03% by weight of a fluorine compound oil is contained in said composition.

3. The rubber-modified aromatic vinyl resin composition as described in claim 1, wherein a proportion of the dispersed grains having a salami structure account for 80% by weight or more based on the whole dispersed grains of the rubber-like polymer dispersed in the rubber-modified aromatic vinyl resin composition, and the dispersed grains of the rubber-like polymer in which a grain number of the aromatic vinyl polymer included in the dispersed grains is 20 or less account for 70% or more based on the whole number of the dispersed grains.

4. The rubber-modified aromatic vinyl resin composition as described in claim 1, wherein the toluene-insoluble matters (X % by weight) contained in the rubber-modified aromatic vinyl resin composition, the rubber component (R % by weight) and the ratio (Y % by weight) of the dispersed grains having the salami structure based on the whole dispersed grains of the rubber-like polymer satisfy a relation represented by Formula (I):

$$2.2 < X/R + 80/Y < 3.3 \quad (I).$$

5. The rubber-modified aromatic vinyl resin composition as described in claim 1, wherein the silicone oil contained in the rubber-modified aromatic vinyl resin composition has a surface tension of 19.5 to 22.0 dyne/cm at 25° C.

6. The rubber-modified aromatic vinyl resin composition as described in claim 2, wherein in the mixed oil of the silicone oil and the fluorine compound oil contained in the rubber-modified aromatic vinyl resin composition, the silicone oil has a surface tension of 18.0 to 25.0 dyne/cm at 25° C., and the fluorine compound oil has a surface tension of 15.0 to 25.0 dyne/cm at 25° C.

7. The rubber-modified aromatic vinyl resin composition as described in claim 2, wherein in the mixed oil of the silicone oil and the fluorine compound oil contained in the rubber-modified aromatic vinyl resin composition, the weight ratio of the silicone oil to the fluorine compound oil is 99:1 to 70:30.

8. The rubber-modified aromatic vinyl resin composition as described in claim 1, wherein a 5 wt % solution of the raw material rubber-like polymer in styrene has a solution viscosity (SV value) falling in a range of 10 to 50 cps at 25° C.

9. The rubber-modified aromatic vinyl resin composition as described in claim 1, wherein a rubber selected from low cis-polybutadiene rubber, styrene-butadiene rubber having a styrene component of 10% by weight or less and a mixture of these rubbers accounts for 70% by weight or more of the raw material rubber-like polymer used.

10. A process for producing the rubber-modified aromatic vinyl resin composition as described in claim 1, characterized by adding silicone oil at an optional stage in steps for producing a rubber-modified aromatic vinyl resin in which a raw material solution of a raw material rubber-like polymer and an aromatic vinyl monomer is continuously fed into polymerizing equipment constituted by connecting a complete mixing type reactor with a plug flow type reactor in series to carry out the polymerization in the complete mixing type reactor to such an extent that the rubber-like polymer is not dispersed and granulated, and further to continue the polymerization in the plug flow type reactor to carry out continuous block polymerization while dispersing and granulating the rubber-like polymer and then volatile substances are removed under reduced pressure, followed by pelletization.

11. A process for producing the rubber-modified aromatic vinyl resin composition as described in claim 2, characterized by adding a mixed oil of a silicone oil and a fluorine compound oil at an optional stage in steps for producing a rubber-modified aromatic vinyl resin in which a raw material solution of a raw material rubber-like polymer and an aromatic vinyl monomer is continuously fed into polymerizing equipment constituted by connecting a complete mixing type reactor with a plug flow type reactor in series to carry out the polymerization in the complete mixing type reactor to such an extent that the rubber-like polymer is not dispersed and granulated, and further to continue the polymerization in the plug flow type reactor to carry out continuous block polymerization while dispersing and granulating the rubber-like polymer and then volatile substances are removed under reduced pressure, followed by pelletization.

* * * * *